March 7, 1944.     E. H. LAND     2,343,775

PROCESS FOR FORMING SHEETS OR FILMS OF LIGHT-POLARIZING MATERIAL

Filed Dec. 12, 1942

Edwin H. Land
INVENTOR.

BY Donald L. Brown
Attorney

Patented Mar. 7, 1944

2,343,775

UNITED STATES PATENT OFFICE 2,343,775

PROCESS FOR FORMING SHEETS OR FILMS OF LIGHT-POLARIZING MATERIAL

Edwin H. Land, Cambridge, Mass., assignor to Polaroid Corporation, Cambridge, Mass., a corporation of Delaware Application December 12, 1942, Serial No. 468,778

10 Claims. (Cl. 88—65)

This invention relates to processes for forming sheets or films of light-polarizing material.

It is one object of the present invention to provide a process for forming a film of light-polarizing material by applying to a continuously moving film of a transparent plastic a coating comprising a suspension of light-polarizing particles and by orienting said particles in parallelism.

Another object is to provide a process as outlined above which may be substantially continuous, and particularly such a process wherein the orienting of the polarizing particles is carried out as said coating is applied to the moving film.

A further object is to provide such a process wherein the orienting of the polarizing particles is carried out by means of the application of a field of force, either mechanical, magnetic or electric, to said coating.

A still further object is to provide a process as outlined above which includes the step of laminating a protective film over the polarizing coating applied to the first named film.

Additional objects and advantages will in part be apparent and in part be pointed out in the course of the following description of several embodiments of the invention, which are given as non-limiting examples, in connection with the accompanying drawing, in which.

Figure 1:
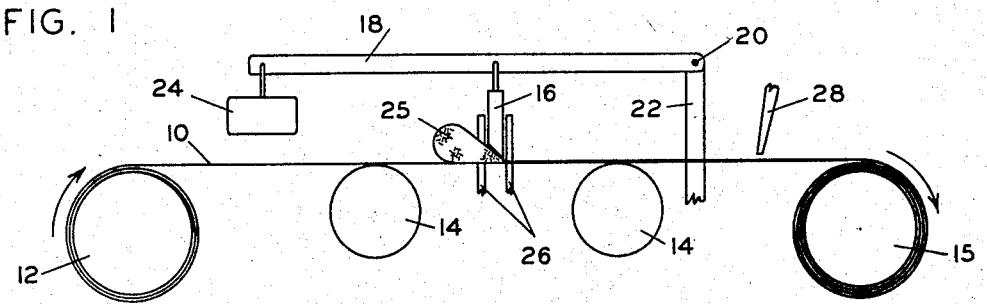
Figure 1 is a diagrammatic view of apparatus suitable for carrying out one embodiment of the invention.

In Fig. 1, backing film 10 is shown as passing from supply roll 12 over a pair of supporting rollers 14 to take-up roll 15. Film 10 may comprise any desired transparent flexible plastic material, for example, a cellulose derivative such as cellulose acetate or cellulose nitrate or a vinyl compound such as a polyvinyl acetal. Element 16 represents a knife or scraper element of a suitable metal such as steel supported by arm 18, which is in turn pivotally mounted at one end 20 to any suitable support 22, and at its other end it is provided with some suitable loading means such as weight 24. Mass 25 represents a mixture of suitable asymmetric polarizing crystals, such for example as colloidal herapathite, in a suitable light-transmitting suspending medium, such for example as cellulose acetate or a vinyl compound such as a polyvinyl acetal.

It is believed that the operation of the above described apparatus will now be apparent. Rolls 12 and 15 are caused to rotate in the direction of the arrows by any suitable means, not shown, and crystal suspension 25 is applied to sheet 10 before the latter passes under knife 16. The suspending medium for the polarizing crystals is preferably chosen initially to have an adhesive affinity for film 10, and the motion of the film therefore causes mass 25 to be gradually drawn or expelled through the orifice between knife 16 and film 10 and to be spread as a thin coating on said film. At the same time, the pressure of knife 16 against the mixture of polarizing crystals and film 10 acts to orient the crystals within said suspension in parallelism as the coating on film 10 is drawn under the knife. It will be understood that more than one knife 16 may be used if desired.

Elements 26 represent guides of any suitable nature which serve to limit motion of knife 16 with respect to the length of film 10. It will be understood that there may be a pair of elements 26 adjacent each end of knife 16. Element 28 represents a nozzle which may be used, if desired, for directing a stream of air against the coating applied to film 10. Such an air blast may be desirable for the purpose of cooling the suspending medium for the polarizing crystals if it is thermoplastic, or if a solvent has been used to render said suspending medium sufficiently plastic, an air blast may be used to facilitate evaporation thereof. It will be understood that in the latter case a drying oven may equally well be used.

It should be understood that the above process is subject to substantial modification without departing from within the scope of the invention. For example, it is not essential that the suspending medium for the polarizing crystals bond permanently to film 10. It may under some circumstances be desired to use such materials that the polarizing coating may be stripped from film 10 after it has set. This may be done, for example, by using a vinyl compound such as polyvinyl acetal as the suspending medium for the polarizing crystals and cellulose acetate in film 10. Moreover, it should be pointed out that the invention may be practiced with glass. For example, successive plates of glass may be mounted on an endless belt and thus carried under coating knife 16. Many similar modifications of the invention will be apparent to those skilled in the art, and are to be construed as coming within the scope hereof.

Figure 2:
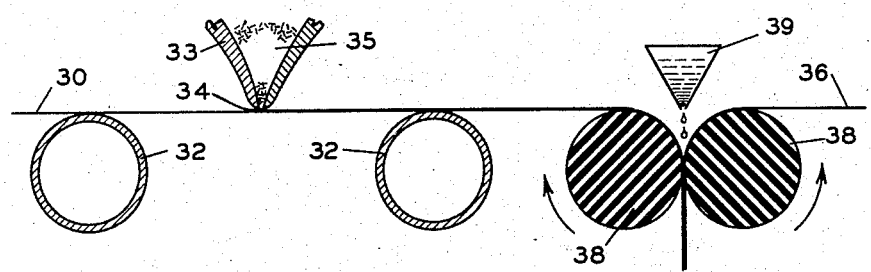
Fig. 2 is a partial view similar to Fig. 1 showing different apparatus suitable for carrying out another embodiment of the process of the invention and including apparatus for laminating a protective film over the polarizing coating.

In Fig. 2, film 30 corresponds to film 10 in Fig. 1, and rolls 32 correspond to rolls 14 in Fig. 1. 33 represents a portion of an extrusion press provided with a suitable die orifice 34 containing a mixture 35 of light-polarizing crystals in a suitable suspending medium. In the operation of this apparatus, sheet 10 is caused to move continuously closely adjacent to die orifice 34, and the mass of polarizing material 35 is extruded thereon. Said extrusion of mass 35 results in bringing about orientation in parallelism of the polarizing crystals contained therein, and this orienting effect is enhanced by the motion of film 10 past the mouth of press 33.

At the right in Fig. 2, there is shown also simple apparatus for laminating a protective coating to the coating of polarizing material on film 30. Film 36 represents a suitable transparent plastic film, which may, for example, be of the same material as film 30. Coated film 30 and film 36 are both caused to run between a pair of pressure rolls 38, which may be formed of any suitable material such as rubber. If mass 35 is still sufficiently plastic, no additional adhesive means may be needed, the pressure of rolls 38 alone being sufficient to bring about bonding to film 36. Adhesion may be facilitated, if desired, by the addition of a small quantity of suitable solvent or softening agent for the suspending medium for the polarizing crystals, and means for supplying said solvent are shown diagrammatically as comprising a suitable hopper 39. If a thermoplastic suspending medium for the polarizing crystals is used, the lamination may be brought about by heat and pressure, as for example by using heated metal rolls at 38.

Figure 3:
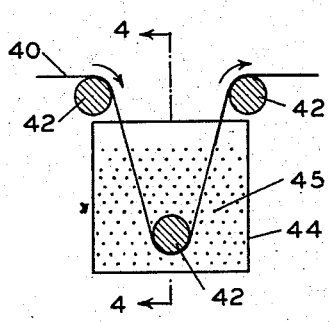
Fig. 3 is a view similar to Fig. 2 showing apparatus for carrying out a modification of the process of the invention wherein orientation of the polarizing particles is carried out by means of an electrostatic field.
Figure 4:
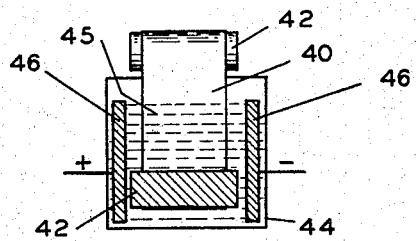
Fig. 4 is a section on the line 4—4 in Fig. 3.

Figs. 3 and 4 show apparatus for the same purpose as that described above but including means for bringing about orientation of polarizing crystals through the operation of an electrostatic field of force. Backing film 40 is guided by means of rollers 42 through a tank 44 containing a relatively fluid suspension 45 of polarizing crystals. Electrodes 46 are positioned on opposite sides within tank 44 and set up an electrostatic field through suspension 45 which causes the crystals to orient as illustrated by the dashes in Fig. 4. As film 40 passes through tank 44, suspension 45 tends to adhere thereto, and if the motion of film 40 is sufficiently slow, a coating of said material will adhere thereto without destroying the orientation of the crystals in said coating. It will be understood that the coating thus acquired may be hardened in any suitable way, as explained above in connection with Fig. 1.

Figure 5:
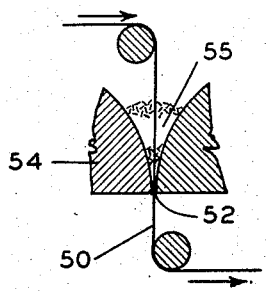
Fig. 5 is a view similar to Fig. 2, showing further modified apparatus suitable for use in the practice of the invention.

Fig. 5 shows further modified apparatus for carrying out the process of the invention. Film 50 corresponds to sheets 10 and 30 in Figs. 1 and 2, and it is shown as passing through the die orifice 52 of an extrusion press 54 filled with a mass 55 comprising polarizing crystals in a suitable suspending medium. The operation of this apparatus is similar to that shown in Fig. 2, in that orientation of the polarizing crystals within mass 55 is brought about as a coating of said material is applied to one or both surfaces of film 50 in passing through orifice 52.

Figure 6:
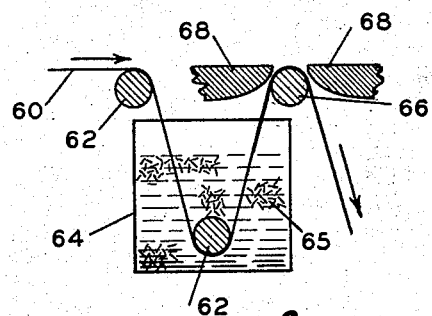
Fig. 6 is a view similar to Fig. 3, illustrating a modification of the process of the invention wherein orientation of the polarizing particles is carried out by means of an electromagnetic field.

Fig. 6 illustrates a modification of the process of the invention wherein orientation of the polarizing particles is brought about through the operation of an electromagnetic field of force. Backing film 60 is guided by means of rollers 62 through a tank 64 containing a relatively fluid suspension 65 of polarizing crystals in heterogeneous orientation. After emerging from the tank, film 60 passes over a roller 66 on each side of which there is positioned one of a pair of poles 68 of a suitable electromagnet which create a magnetic field parallel to the length of film 60 and thereby cause the crystals in the coating deposited therein to orient as the coating hardens. It will be apparent that hardening of the coating may be facilitated, if desired, by the provision of suitable air jets or the like similar to jet 28 in Fig. 1.

It is to be understood that all of the above described devices are given merely as illustrative of suitable apparatus for carrying out the process of the invention. The process may be carried out in many other ways and with many different forms of apparatus, and it is accordingly to be understood that the invention is not limited to the specific devices shown.

What is claimed is:

1. The process of making a light-polarizing body which includes the steps of forming a plastic suspension of polarizing crystals of asymmetric contour, unwinding a roll of transparent backing material, orienting said crystals in substantial parallelism by extruding said suspension upon one side of said backing material while it is moving, and setting said suspension with said crystals in permanent alignment upon said backing material while it is moving.

2. The process of making a light-polarizing body which includes the steps of advancing a sheet of transparent supporting material, simultaneously applying to a surface of said sheet a coating of a suspending medium having dispersed therethrough a mass of colloidal dichroic particles and containing a solvent, orienting by extrusion the polarizing axes of said particles in substantial parallelism prior to its application to said sheet of transparent material, and evaporating said solvent from said coating to cause said coating to set with said particles in permanent alignment and permanently secured to said base.

3. The process of making a light-polarizing body which includes the steps of unwinding a roll of flexible, transparent material and applying to a surface of said material as it is moving in permanently secured relation thereto a coating comprising a suspending medium of cellulose derivative material having dispersed therethrough a mass of colloidal polarizing particles, and orienting said particles with their polarizing axes in substantial parallelism at the point of application of said coating to said transparent material by subjecting the particles to a field of force to which they are responsive.

4. The process of making a light-polarizing body which comprises forming a plastic suspension of dichroic crystals of asymmetric contour and containing a solvent, expelling said suspension through an orifice upon a moving transparent film to produce a coating of oriented crystals permanently secured to said film at the point of application to said film, and evaporating said solvent to set said suspension with said crystals in oriented position.

5. The process of making a light-polarizing body which includes the steps of forming a plastic suspension of dichroic crystals of asymmetric contour, orienting by extrusion the polarizing axes of said crystals in substantial parallelism, applying a coating of said suspension of oriented crystals to an advancing sheet of transparent supporting material, setting said coating with said crystals in oriented position upon said advancing supporting material and permanently secured thereto, and applying to said coating a transparent protective lamina.

6. The process of making a light-polarizing body which comprises forming a bath of material having embedded therein crystals of asymmetric contour, applying an electric field to said bath to orient said crystals in alignment, then depositing said oriented crystals suspended in said material and in the same alignment they possess in said bath upon a moving transparent base to form a coating for permanent association with said base.

7. The process of making a light-polarizing body which includes the steps of advancing a transparent base material coated with a plastic suspension of dichroic particles and which suspension contains a solvent, subjecting said suspension in its plastic state to a field of force while said base material is advancing to thereby cause said particles to align in parallelism, evaporating from said aligned suspension on said base said solvent to produce setting of said suspension with said dichroic particles in alignment and permanently secured to said base, and applying to said suspension a transparent protective lamina by heat and pressure.

8. The process of making a light-polarizing body which includes the steps of advancing a transparent base material coated with a plastic suspension of dichroic crystals and which suspension contains a solvent, orienting the crystals in said suspension in its plastic state by applying a field of force thereto while said base material is advancing, and while said crystals are oriented upon said base simultaneously evaporating from said suspension said solvent to cause said suspension to set with said crystals in permanent alignment and permanently secured to said base.

9. The process of making a light-polarizing body which includes the steps of advancing a transparent base material, coating said base material with a plastic suspension of polarizing crystals and which suspension contains a solvent, orienting the crystals in said suspension in its plastic state at the point of application to said base material by applying a field of force thereto while said base material is advancing, and while said crystals are oriented upon said base simultaneously evaporating from said suspension said solvent to cause said suspension to set with said crystals in permanent alignment and permanently secured to said base.

10. The process of making a light-polarizing body which includes the steps of unwinding a roll of flexible, transparent material and applying to a surface of said material as it is moving in permanently secured relation thereto a coating comprising a suspending medium of a vinyl compound material having dispersed therethrough a mass of light-polarizing particles, and orienting said particles with their polarizing axes in substantial parallelism at the point of application of said coating to said transparent material by subjecting the particles to a field of force to which they are responsive.

EDWIN H. LAND.